UNITED STATES PATENT OFFICE.

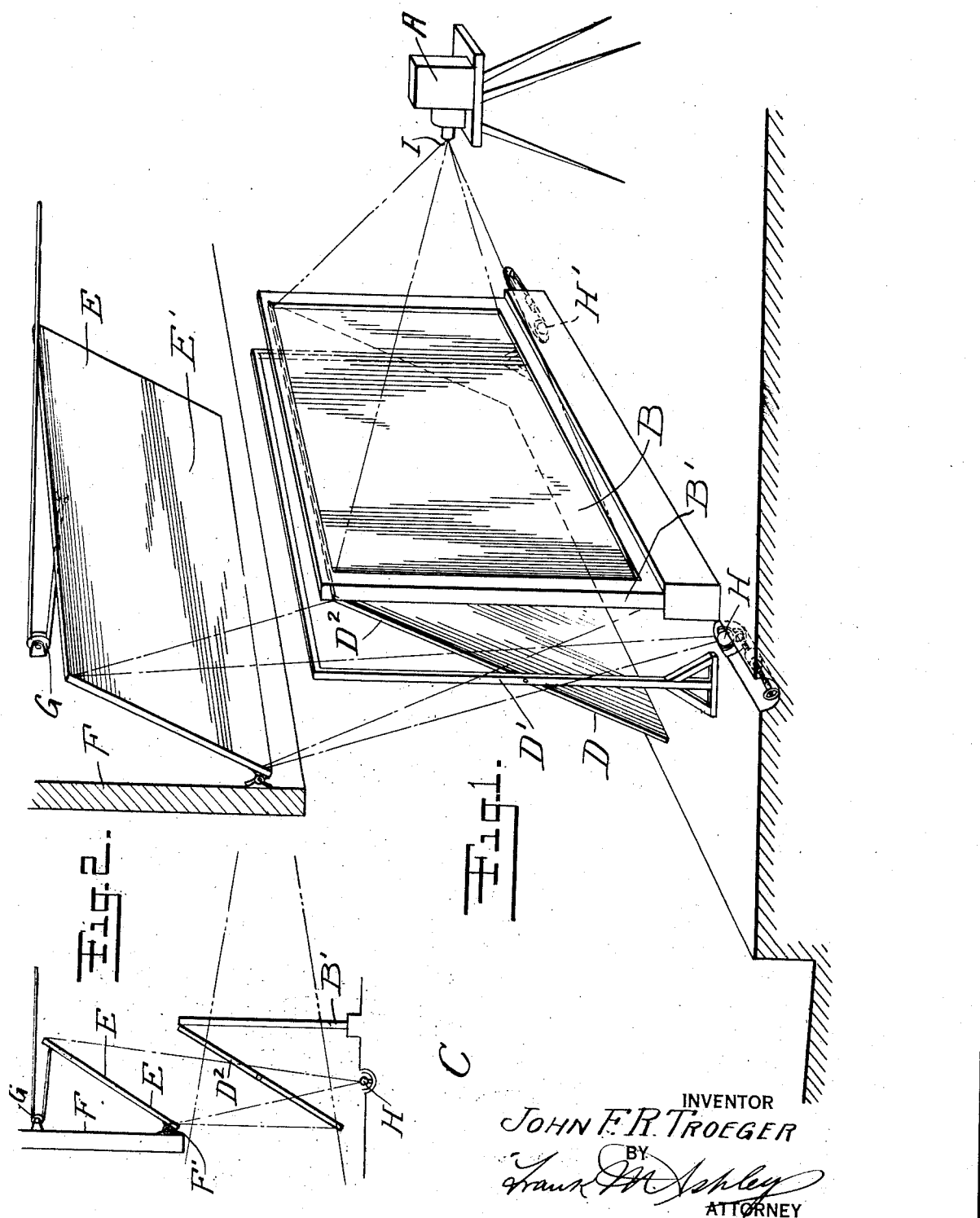

JOHN F. R. TROEGER, OF NEW YORK, N. Y., ASSIGNOR, BY MESNE ASSIGNMENTS, TO AMERICAN LUX PRODUCTS CORPORATION, OF NEW YORK, N. Y., A CORPORATION OF DELAWARE.

SCREEN FOR MOTION PICTURES.

1,422,149.  Specification of Letters Patent.  Patented July 11, 1922.

Application filed November 3, 1919. Serial No. 335,233.

*To all whom it may concern:*

Be it known that I, JOHN F. R. TROEGER, a citizen of the United States, and resident of New York city, in the county of Kings and State of New York, have invented certain new and useful Improvements in Screens for Motion Pictures, of which the following is a specification.

My invention relates to the art of projecting and displaying pictures and the object of my invention is to provide means for displaying pictures on a screen in such manner as to appear more life-like and with better stereoscopic effect than has been possible heretofore. In carrying my invention into practice, I preferably employ the translucent screens described in my two United States Patents No. 1,151,502 of August 24th, 1915, and No. 1,216,380 of February 20th, 1917, as they are well suited for use with the present invention.

Referring to the drawings which form a part of this specification:

Figure 1 is a perspective view showing the relative location of the projecting apparatus, screen, reflectors and auditorium.

Figure 2 is a side view of the apparatus on a reduced scale.

A indicates the projector which is located behind the screen B, said screen being made of translucent material as described in my patents above referred to, the audience being seated in front of the screen in the space indicated by C. D indicates a second screen of transparent material such as clear plate glass supported in swinging relation to screen B as shown. The screen D is supported in a frame D' that can be moved relative to the frame B' which holds the screen B. E indicates a reflector which is located above the screen D with its reflecting surface arranged parallel with the surface $D^2$ of the screen D. The reflector E is preferably supported on the wall F by means of hinges, one of which is indicated by F', and by means of a cord and pulley combination indicated by G, and the reflector may be adjusted and held in proper relative position to the screen D.

The reflecting surface E' is preferably a cloth fabric of light brown material having a glossy surface which reflects the light projected thereon from the lamps H and H' respectively, located at each side of the screen B and far enough away from the frame B' to permit the light to fall full upon the entire surface of the reflector E, and the light is reflected onto the surface $D^2$ of the screen D. The light from the lamp I of the projector A conveying the picture is thrown onto the screen B and the picture is then visible to the audience. In view of the fact that the patents above referred to give a complete description of the screen B and its composition, further description herein is not believed to be necessary. The pictures appear to the audience to be at the plane D which may be placed quite a distance from the screen B and gives the illusion of the actors being on the stage in person.

Having thus described my invention, I claim as new and desire to secure by Letters Patent:

1. The combination of two screens the surfaces of which are arranged at an angle to each other for the purpose specified and a reflector for reflecting light to the surface of one of said screens, said reflector having its reflecting surface made of fibrous material.

2. The combination of two screens the surfaces of which are arranged at an angle to each other for the purpose specified, a reflector for reflecting light to the surface of one of said screens located above the screen to be illuminated, and means for illuminating the surface of said reflecting surface located at each side of the screens 3. A translucent screen through which the picture is projected, and a transparent screen in front of and arranged at an angle to the translucent screen and a reflecting surface arranged parallel with said transparent screen for the purpose set forth, lighting means located at each side of and behind said transparent screen and means for reflecting the light therefrom to the transparent screen.

Signed at New York city in the county of New York and State of New York.

JOHN F. R. TROEGER.